No. 684,432. Patented Oct. 15, 1901.
H. R. ISLER.
ENGINE LATHE.
(Application filed Nov. 26, 1900.)
(No Model.) 3 Sheets—Sheet 1.
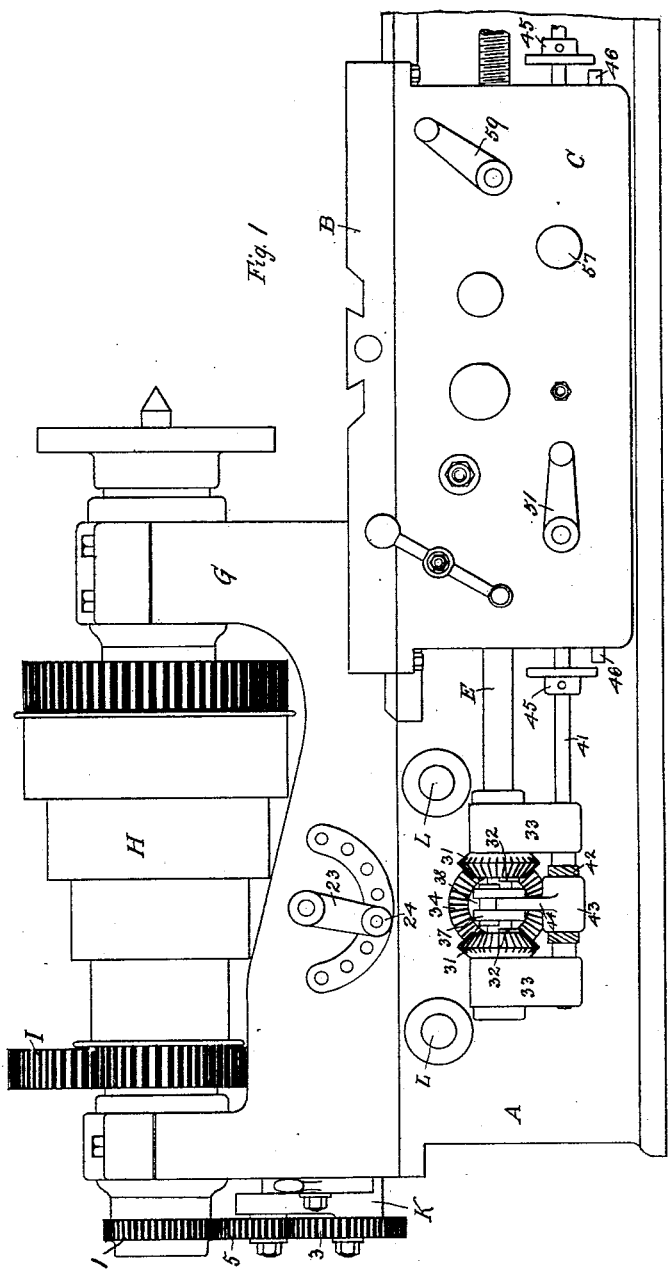
WITNESSES
Carl Vollenweider
Edgar B. Schneider
INVENTOR
Herman R. Isler

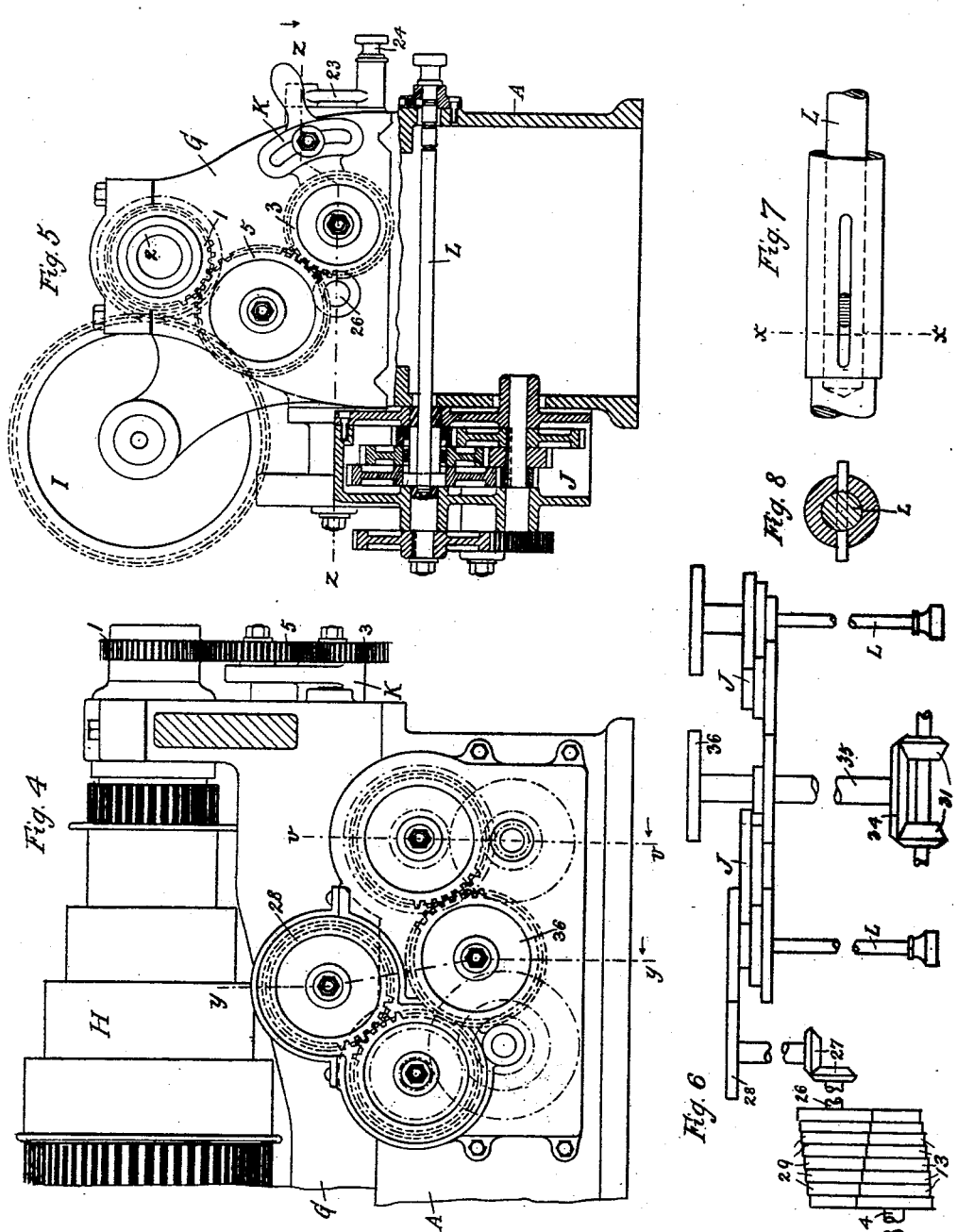

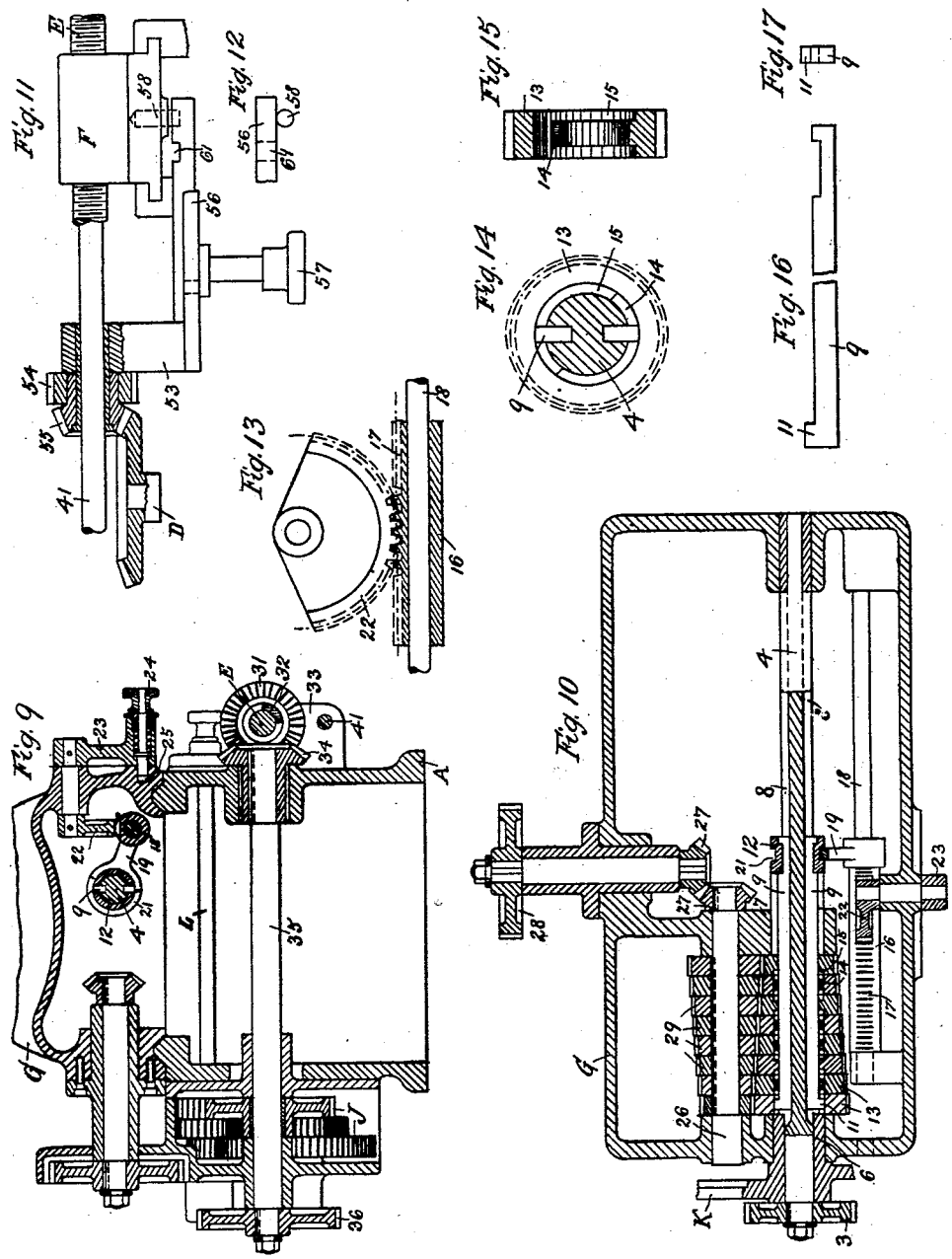

UNITED STATES PATENT OFFICE.

HERMAN R. ISLER, OF HAMILTON, OHIO, ASSIGNOR TO CHARLES F. HILKER, OF SAME PLACE.

ENGINE-LATHE.

SPECIFICATION forming part of Letters Patent No. 684,432, dated October 15, 1901.

Application filed November 26, 1900. Serial No. 37,835. (No model.)

*To all whom it may concern:*

Be it known that I, HERMAN R. ISLER, a citizen of Switzerland, and a resident of Hamilton, Ohio, have invented certain new and useful Improvements in Engine-Lathes, of which the following is a specification.

My invention relates to engine-lathes of the screw-cutting class; and the objects of my improvement are to provide means to graduate the speed of the lead-screw to minor predetermined ratios between the major divisions of speed established by the change-gear, and thus multiply the number of speed changes within the same range of speed, to provide an adjustable automatic stop for the tool-carriage, and means to prevent the simultaneous engagement of the carriage with the lead-screw and with the rack-and-pinion feeding mechanism. These objects are attained in the following-described manner, as illustrated in the accompanying drawings, in which—

Figure 1 is a side elevation of the portion of a lathe embodying my improvement; Fig. 2, a rear elevation of the apron with parts in section; Fig. 3, an enlarged section of the stop and reversing mechanism; Fig. 4, a rear elevation of portions of the lathe and head-stock; Fig. 5, an end elevation, with parts in section, on the line $v\ v$ of Fig. 4; Fig. 6, a diagram of the change-gears; Fig. 7, portions of a pull-rod and sleeve; Fig. 8, a cross-section on line $x\ x$ of Fig. 7; Fig. 9, a section of the bed and head-stock on the line $y\ y$ of Fig. 4; Fig. 10, a sectional plan on the line $z\ z$ of Fig. 5, and Figs. 11, 12, 13, 14, 15, 16, and 17 details of construction.

In the drawings, A represents the lathe-bed, B the tool-carriage, C the apron, provided with the train of rack-and-pinion feed-gears D, E the lead-screw, F the split nut on the apron, which engages with the lead-screw, G the head-stock, H the cone-pulley, I the back-gear, J the train of change-gears, mounted on the rear of the bed, K the shifting quadrant, and L the pull-rods for the change-gears J, all constructed and arranged in the ordinary manner.

Spur-gear 1 on live-spindle 2 transmits motion to gear 3, secured on shaft 4, through intermediate shifting gear 5. Said shaft is journaled within the head-stock in bearings 6 and 7 and is formed with longitudinal grooves or seats 8 on its opposite sides. Splines 9, formed with lugs 11 on one end to project radially beyond the surface of the shaft, are movable in said grooves by means of collar 12, to which they are secured, and which collar is arranged to slide on the shaft.

A series of spur-gears 13 are graduated in size to form a cone and mounted to turn on shaft 4 between its bearings. Each of said gears is formed with slots or seats 14 on opposite sides of its bore to engage with or permit the passage therethrough of the lugs on the respective splines 9 and with counter-bores 15 to form recesses between them to permit the lugs to be disengaged from one gear before engaging the contiguous gear.

Sleeve 16, formed with rack 17, is mounted to slide on guide 18, which is secured within the head-stock parallel with shaft 4. Yoke 19 is carried by said sleeve and engages with annular groove 21, formed in collar 12. The sector of a pinion 22, journaled in the front wall of the head-stock, engages with the rack on the sleeve and is actuated by crank-lever 23, secured thereon, to move the splines until the lugs thereon become engaged with either of the gears 13, and in which position of engagement they are maintained by the engagement of spring-plunger 24, mounted on the crank-lever, with the corresponding hole 25, formed in the head-stock.

Shaft 26, journaled within the head-stock and parallel with shaft 4, transmits motion to the change-gear J through miter-gears 27 and spur-gear 28. A series of spur-gears 29 are secured on said shaft and graduated in size to form a cone in reversed position, but similar to that formed by gears 13, and with which gears they are respectively in continuous engagement. The speed of shaft 26 may be graduated into minor predetermined divisions between the major divisions provided by the change-gears J by separately engaging the different gears 13 with shaft 4, as described, and permitting the remaining gears 13 to be driven idly and at differential speeds on shaft 4 by gears 29.

Bevel-pinions 31, formed with clutch-lugs 32 on their adjacent faces, are independently journaled in brackets 33 on the front of the lathe-bed and turn idly on the end portion of the lead-screw, which is extended axially therethrough. They are driven in opposite directions, respectively, by the continuous engagement therewith of bevel-gear 34, secured on shaft 35, which communicates with the change-gears J through spur-gear 36 thereon.

Clutch 37, formed with annular groove 38 and splined on the lead-screw between the pinions 31, is movable into engagement with lugs 32 on either of said pinions to rotate the lead-screw in the corresponding direction therewith. Shaft 41, journaled at one end in brackets 33, has an externally-threaded sleeve 42 secured thereon between the brackets, and nut 43 is threaded on the sleeve and formed with a projecting yoke 44, which engages with groove 38 in the clutch 37 and shifts the clutch into and out of engagement with either of the pinions 31, according to the direction of the rotation of shaft 41. Said shaft 41 is extended rearwardly along the front of the lathe-bed parallel with the lead-screw and under the apron and is journaled in a bearing (not shown) on the rear end of the lathe-bed. It is formed with a longitudinal groove or seat 42, and bevel-pinion 43 is splined thereon and also journaled in bearing 44, formed on the rear side of the apron. Stops 45 are adjustably secured on said shaft and on opposite sides of the apron to engage with the corresponding end of and slide rod 46, which is carried by the apron and which is preferably square in cross-section to prevent it from turning. Collar 47 is adjustably secured on said rod and movably engages with pin 48, which projects from the face of the segment of a bevel-gear 49, that engages bevel-pinion 43. Said segment 49 is journaled in the apron and may be actuated to shift rod 46 by means of crank-lever 51, secured thereto and in front of the apron. When the carriage is fed in either direction by the lead-screw until the end of rod 46 is carried against the corresponding stop 45, the further movement of the rod is prevented and the continued movement of the carriage actuates segment 49 to rotate pinion 43 and shaft 41, whereby clutch 37 is disengaged from the corresponding bevel-pinion 31, and the movement of the lead-screw and the carriage is discontinued. The continued movement of said segment, however, by means of crank 51 shifts clutch 37 into engagement with the opposite pinion 31, whereby the rotation of the lead-screw is reversed and the carriage is fed in the opposite direction.

Spur-gear 52, splined on the lead-screw, is journaled in a movable member 53 behind the apron in the usual manner and engages with pinion 54, which is also journaled in and carried by member 53 and is loosely sleeved on shaft 41. Bevel-pinion 55, secured on spur-pinion 54 and concentric therewith, detachably engages with the ordinary train D of rack-and-pinion or apron gears. (Shown by dotted lines in Fig. 2.)

Arm 56, which projects at right angles from member 53 and parallel with the lead-screw, terminates opposite the split nut F. Eccentric knob 57 on the apron is arranged to shift member 53, with pinion 55, in and out of engagement with the apron-gears D. When said pinion is so engaged, the end of arm 56 intercepts pin 58, which projects from the split nut F and prevents said nut from being closed into engagement with the lead-screw; but when said pinion is disengaged slot 61, formed in arm 56, is moved into registration with the pin, and wherein said pin is inserted by the closing movement of the split nut by means of crank 59 in the usual manner. While the split nut remains closed on the lead-screw, the pin remains in said slot and prevents pinion 55 from being shifted into engagement with the apron-gears by member 53. In this manner any conflict between the feeding of the carriage by the engagement of the split nut with the lead-screw for the purpose of cutting screws and by the apron-gears being engaged with the rack (not shown) on the lathe-bed for ordinary turning purposes is prevented.

Having fully described my improvement, what I claim as my invention, and desire to secure by Letters Patent of the United States, is—

1. In an engine-lathe, the combination with two shafts each journaled parallel with the other within the head-stock and in fixed bearings formed therein, the one of said shafts communicating with the live-spindle and the other with the lead-screw, one of said shafts being formed with a longitudinal groove or seat, a series of spur-gears mounted to turn independently thereon, said gears being each formed with a counterbore and with a seat, and a series of similar gears respectively engaging with said gears and secured on said other shaft, of a spline movable along the said groove in the shaft, a lug projecting from one end thereof within either of the counterbores, a collar mounted to slide on the shaft and secured to the other end of the spline, and means arranged to move and lock the collar with the lug on the spline in engagement with the seat formed in either of the gears.

2. In an engine-lathe, the combination with a driven pinion, a clutch mechanism adapted to engage the lead-screw therewith, a rotative shaft arranged to shift the clutch in and out of engagement with the driven pinion, and a stop adjustably secured on the shaft, of a rod carried by the apron against the stop, an oscillating gear and gears engaging with the shaft and actuated by the rod to rotate the shaft and disengage the clutch from the driven pinion.

3. In an engine-lathe, the combination with a lead-screw, a split nut mounted on the apron and movable into engagement therewith, and a pin projecting from the nut, of a movable member, gears carried thereby to engage the apron with the rack-and-pinion feeding mechanism, and an arm formed with a slot being secured to said member and movable in one direction thereby into a position to intercept the pin and prevent the nut from being engaged with the lead-screw and movable in the opposite direction in a position with the slot in registration with the pin, whereby the pin engages with the slot when the nut is closed and prevents the movement of the member, and the arm prevents the engagement of the nut with the lead-screw when moved in the position to engage the apron with the rack-and-pinion feeding mechanism.

4. In an engine-lathe, the combination with a rotative shaft provided with an adjustable stop, a clutch movable thereby to engage and disengage the lead-screw with a driven pinion, a pinion carried by the apron and splined on the shaft, and a segmental gear engaging therewith, of a movable rod arranged to actuate the segmental gear and rotate the shaft when it is carried by the apron in contact with the stop.

5. In an engine-lathe, the combination of a rotative shaft, an adjustable stop, a clutch movable thereby to engage and disengage the lead-screw with a driven pinion, the apron, movable on said shaft, an oscillating gear, a movable rod, and an adjustable connection between said rod and the oscillating gear, as set forth.

6. In an engine-lathe, the combination of a rotative shaft, an adjustable stop, a clutch movable thereby to engage and disengage with a driven pinion the lead-screw, an apron movable on said shaft, an oscillating gear journaled in the apron a crank-lever secured in front of the apron, a movable rod, and an adjustable pivotal connection between said rod and the oscillating gear, as set forth.

7. In an engine-lathe, the combination of a rotative shaft, an adjustable stop, a clutch movable to engage and disengage the lead-screw with a driven pinion, the apron, an oscillating gear, a movable rod, an adjustable pivotal connection between the rod and the gear and connections for shifting the clutch in opposite directions by the movement of said oscillating gear, as set forth.

HERMAN R. ISLER.

Witnesses:
ROBERT S. CARR,
SAMUEL S. CARR.